United States Patent
McCloskey et al.

[15] 3,656,821
[45] Apr. 18, 1972

[54] SELF-ALIGNING BEARING

[72] Inventors: Albert R. McCloskey; Alfred Rozentals, both of Fairfield, Conn.

[73] Assignee: Heim Universal Corporation, Fairfield, Conn.

[22] Filed: Aug. 5, 1970

[21] Appl. No.: 61,294

[52] U.S. Cl. ..............................................308/72
[51] Int. Cl. .......................................F16c 23/04
[58] Field of Search..............287/90 R, 90 P; 308/72, 238

[56] References Cited

UNITED STATES PATENTS

| | | | |
|---|---|---|---|
| 3,342,513 | 9/1967 | Melton et al. | 287/90 A |
| 3,560,035 | 2/1971 | Kindel | 287/90 R |

FOREIGN PATENTS OR APPLICATIONS

| | | | |
|---|---|---|---|
| 852,139 | 10/1960 | Great Britain | 287/90 A |

Primary Examiner—Martin P. Schwadron
Assistant Examiner—Frank Susko
Attorney—John R. Bronaugh, E. Dennis O'Connor and Floyd S. Levison

[57] ABSTRACT

A self-aligning bearing comprising an outer member with an open portion with at least one annular groove disposed therein, an inner member with a convex outer surface, and an intermediate member of a preformed resilient, self-lubricating material, said intermediate member having at least one annular lip, said lip adapted to register with said annular groove in said outer member to mechanically restrain said intermediate member in place within said open portion of said outer member and to mechanically restrain said inner member in place within said intermediate member, said intermediate member, when in its assembled position, having a spherical inner surface generally conforming to the convex outer surface of said inner member.

10 Claims, 4 Drawing Figures

PATENTED APR 18 1972  3,656,821

INVENTORS
Albert R. McCloskey &
Alfreds Rozentals

SELF-ALIGNING BEARING

BACKGROUND OF THE INVENTION

The present invention relates generally to self-aligning bearings having a ball-like inner member and an intermediate member of resilient, self-lubricating material. Bearings having ball-like members, or as they are commonly called, "spherical bearings," have been utilized in industry for a substantial period of time. The technological evolution of these type bearings has been directed more at the material composition of the components rather than toward basic changes in design concepts. Accordingly, as new materials became available, and, in particular, lubricating-type materials, they were typically incorporated in spherical bearings.

One area of particular interest has been lubrication of spherical bearings, and with the advent of materials such as Teflon, Delrin, Celcon, and the like, an attempt was made to use these type materials as a substitute for conventional lubricating oils and greases. Such an example of this approach is found in U.S. Pat. No. 2,958,927, wherein a fabric composed of Teflon yarn is directly secured to the bearing surface.

Another typical prior art approach is the chemical bonding of self-lubricating sheet material to the bearing surfaces.

These approaches, while having limited success in effecting lubrication between the bearing parts, have had one fundamental weakness. The viability of the bond and, accordingly, overall life of the bearing cannot be reliably tested until the bearing is subjected to actual operating conditions. That is, after the self-lubricating material has been bonded or otherwise chemically attached to the bearing parts, it is virtually impossible to determine the effectiveness of the bond or the integrity of the bearing surface defined by the self-lubricating material.

An additional problem that confronts the typical prior art approaches is that the bonding requires closely controlled manufacturing operations requiring extensive use of sophisticated equipment and highly trained personnel.

SUMMARY OF THE INVENTION

It is therefore, a primary object of the present invention to provide a bearing wherein the self-lubricating material is mechanically interlocked within the bearing assembly.

It is yet another object of the present invention to provide a bearing which may be inexpensively assembled yet be of extremely high quality with closely controlled tolerances.

These and other objects together with the advantages thereof over the existing prior art forms will become apparent from the following specification, and are accomplished by means prescribed herein and claimed herein.

In general, a bearing provided by the concept of the present invention employs a self-aligning bearing having an outer member with an open portion with at least one annular groove disposed therein, an inner member with a convex outer surface, and an intermediate member of a resilient, self-lubricating material, said intermediate member having at least one annular lip, said lip adapted to register with said annular groove in said outer member to mechanically restrain said intermediate member in place within said open portion of said outer member and to mechanically restrain said inner member in place within said intermediate member, said intermediate member, when in its assembled position, having a spherical inner surface generally conforming to the convex outer surface of said inner member.

The inner member may be so constructed as to form a male rod end-type bearing or the inner member may be provided with a hole so as to form a female-type rod end bearing assembly. Additionally, it may be in a cartridge form adaptable for many uses, such as incorporation in a pillow block assembly.

Several embodiments of a bearing according to the concept of the present invention are shown by way of example in the accompanying drawings without attempting to show all of the various forms and modifications in which the invention might be embodied; the invention being measured by the appended claims and not by the details of the specification.

DESCRIPTION OF THE INVENTION

Figure 1:
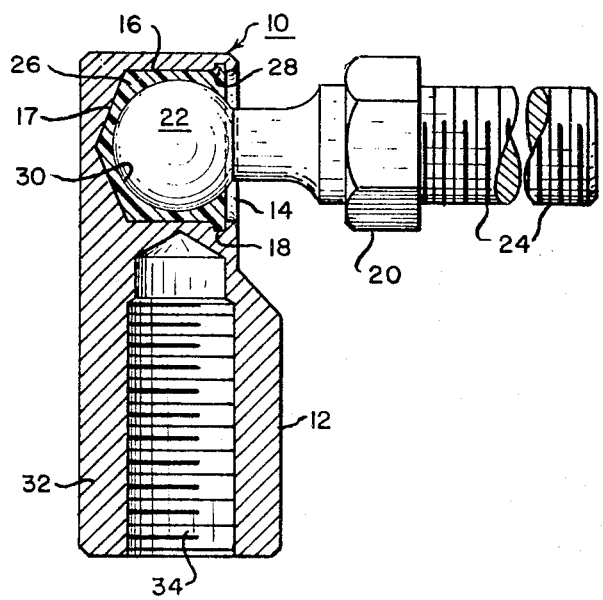
FIG. 1 is a side view and partial transverse section of a bearing in accordance with the present invention.
Figure 2:
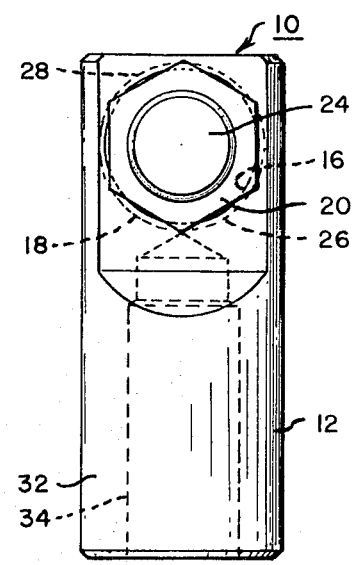
FIG. 2 is an end view of the bearing of FIG. 1.

A bearing embodying the concept of the present invention is generally indicated by numeral 10 on the attached drawings, and, in particular, FIGS. 1 and 2.

The bearing 10 may be of the male or female rod end type. The bearing 10 comprises an outer member 12, which may be of any suitable material, the material being dictated by the operational application and environment. Typically, it may be of bronze, aluminum or steel, and formed by various methods, such as machining, casting, and the like.

The outer member 12 has an open portion 14, which may have a cylindrical section 16 and a conical section 17. The conical section is so formed because it typically corresponds to the conical shape of the drilling tool used to shape the open portion 14. The open portion 14 may also be provided with at least one annular groove 18, the annular groove preferably being at or near the open end of the open portion. The groove or grooves 18 may be disposed at any position within the open portion 14.

The bearing 10 is also provided with an inner member 20 with a ball-like section 22. The ball-like section 22 of the inner member 20 has a convex outer surface and the inner member 20 may be made of any suitable material, which, as indicated above, is determined by the operational application and environment. The inner member 20 may be formed by various methods, such as casting, machining, and the like. The inner member 20, which is rotatably mounted in said intermediate member, may be provided with a threaded extension 24, which may be attached to a linkage system or industrial or marine control system, such as a throttle control system for earth-moving equipment. The outer member may also be provided with an extension 32 which may have internal threads 34 for appropriate attachment to such a linkage system.

The bearing 10 is also provided with a preformed intermediate member 26, which may be of any commercially available thermoset or thermoplastic; for example, commercially available nylon, acetels (e.g., Celcon and Delrin, trademarks of Celanese Corporation and E. I. duPont de Nemours & Co., respectively), polycarbonates (e.g., Lexan 191, a trademark of General Electric Company), or fluorocarbonates (e.g., Teflon, a trademark of E. I. duPont de Nemours & Co.) or phenolic resins.

It is important that the intermediate member have the proper resiliency and strength and chemical properties for the operational application and environment and may be preformed before assembly by various means, such as by machining, molding, and the like. The intermediate member may further be of a composite structure itself, as, for example, it may be provided with a nylon fabric embedded within a Teflon matrix.

The intermediate member 26 may have at least one annular lip 28 and the lip is disposed at or near the open end of the intermediate member 26. The annular lip 28, of course, may be disposed at any position along the length of the intermediate member 26 and, further, the intermediate member 26 may be provided with multiple annular lips 28. The lips 28 are disposed on the intermediate member 26 such that they register with the annular grooves disposed within the open portion 14 of the outer member as the bearing is assembled in a manner to be later discussed. By so registering with the annular groove 18, the lip 28 mechanically restrains the intermediate member 26 in place within the open portion 14 of the outer member 12 while at the same time mechanically restrains the inner member 20 at its spherical end 22 within the intermediate member 26. The intermediate member 26, when in its assembled position, will have an inner surface defining a spherical bearing surface 30 which generally conforms to the convex outer surface of the spherical end 22 of the innner member 20. It is obvious from the above description that each part may be carefully examined before it is assembled to determine if they have any imperfections or undesirable characteristics which might adversely effect the performance of the bearing. In particular, the intermediate member 26 can be closely examined to insure that it possesses no cracks or discontinuities which will eventually lead to the premature failure to the bearing due to lack of lubrication.

It will also be obvious from the above description that the tolerance of the various parts can be very closely controlled. The intermediate member 26 can be so shaped as to vary the tolerance between its concave inner surface 30 and the convex outer surface of the spherical member 22 to obtain the proper torque required to rotatably move the ball member 22 within the intermediate member 26. In contrast, if the intermediate member was generated by injection molding the member in place within the bearing, it would be extremely difficult to control the tolerances between the bearing parts, and, in particular, between the ball and its mating surface, and equally as difficult to determine whether or not the so-generated part is free from defects.

By disposing at least one of the annular lips 28 at or near the open portion 14, a further advantage is derived in that the restraining action of the annular lip is further fortified by the force of the spherical ball 22 when a load is applied to the inner member 20 and, in particular, when the load is applied in a direction which would tend to pull the spherical ball 22 out of the inner member 26. Accordingly, by choosing the proper combination of materials, the bearing is capable of withstanding extremely heavy loads.

Assembly of the bearing 10 is accomplished by using commercially available production tools, jigs and fixtures. All that is required is that the inner member 26 be assembled on the sperhical ball 22 for ultimate insertion into the open portion 14 of the outer member 16. As the intermediate member 26 and the spherical ball 22 of the inner member 20 is progressively inserted into the open portion 14 of the outer member, the lip 28 will register with the annular grooves 18, thereby mechanically interlocking the various components of the bearing in a closely controlled fashion.

Figure 3:
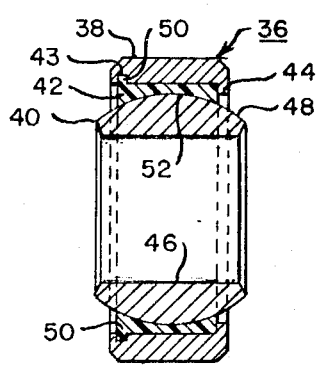
FIG. 3 is a side view, in transverse section, of another embodiment of a bearing in accordance with the present invention.
Figure 4:
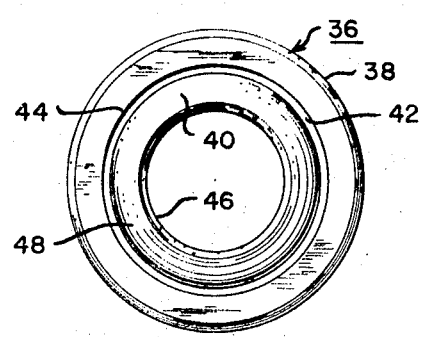
FIG. 4 is an end view of the bearing of FIG. 3.

Referring now to FIGS. 3 and 4, there is shown a bearing 36 having an outer member 38, an inner member 40 and an intermediate member 42 of a resilient, self-lubricating material. The material of the various components of the bearing 36 will be selected on the same basis, giving consideration to the same factors, as those in connection with the above bearing.

The outer member 38 of the bearing 36 is open at both ends and has at least one annular groove 43 disposed within its interior surface. The outer member 38 may also be provided with at least one annular lip 44, the purpose of which is to be discussed later.

The inner member 40 of the bearing 36 has a hole 46 axially through its center. The inner member 40 has a convex outer surface 48. The intermediate member 42 also has a hole axially through its center and the member has at least one annular lip 50. The lip 50 is adapted to register with the annular groove 43 in the outer member 38 to mechanically restrain the intermediate member 42 in place within the open portion of the outer member 38 while at the same time mechanically restraining the inner member 40 within the intermediate member 42. The annular lip 44 of the outer member 38 will further assist the mechanical interaction of the annular lip 50 and the annular groove 43 by providing a seat upon which the intermediate member will rest in its assembled position. The coaction thus provided and the annular groove-lip combination effectively maintains the integrity of the bearing assembly and axially restrains the intermediate member 42 in place.

The inner surface 52 of the intermediate member 42, when the intermediate member is in its assembled position, defines a concave inner surface generally conforming to the convex outer surface of the inner member 40. Assembly of the bearing 36 is easily accomplished in a manner substantially the same as that employed in the above-discussed embodiment of the present invention. As with the above embodiment, the inner member 40 is placed within the intermediate member 43 and then inserted within the outer member 38. As the inner and intermediate members are progressively inserted within the outer member 38, the annular lip 50 registers with the annular groove 43 and the outer member 38 to mechanically interlock the bearing assembly. The resilience of the intermediate member 42 enables the annular lip 50 to "snap" into place into the annular groove 42, and, accordingly, as in the case with the above-discussed bearing, the use of special process tools, dies, jigs and fixtures is obviated.

Although the above embodiments have embodied the use of an annular lip disposed on the intermediate member, it is to be understood that the opposite relationship could also be provided within the scope of the present invention. That is, the intermediate member may be provided with annular lips or ribs and/or grooves which, in turn, could effect the mechanical interlocking and integrity of the bearing assembly.

While certain specific embodiments have been alluded to for the purpose of illustration, it is to be understood that the present invention can be applied to various uses and adaptations that may be made therein, as will be apparent to a person skilled in the art.

What is claimed is:

1. A self-aligning bearing comprising an outer member with an open portion with at least one annular groove disposed therein, an inner member with a convex outer surface, and an intermediate member of preformed resilient, self-lubricating material, said intermediate member having at least one annular lip, said lip adapted to register with said annular groove in said outer member to solely mechanically restrain said intermediate member in place within said open portion of said outer member and to solely mechanically restrain said inner member for rotatable movement within said intermediate member, said intermediate member, when in its assembled position, having a spherical inner surface generally conforming to the convex outer surface of said inner member and forming the sole bearing surface for the inner member.

2. A self-aligning bearing comprising an outer member with an open portion with at least one annular lip disposed therein, an inner member with a convex outer surface, and an intermediate member of preformed resilient, self-lubricating material, said intermediate member having at least one annular groove, said lip adapted to register with said annular groove in said intermediate member to solely mechanically restrain said intermediate member in place within said open portion of said outer member and to solely mechanically restrain said inner member for rotatable movement within said intermediate member, said intermediate member, when in its assembled position, having a spherical inner surface generally conforming to the convex outer surface of said inner member and forming the sole bearing surface for the inner member.

3. A self-aligning bearing according to claim 1 wherein there is one annular lip disposed on said intermediate member to register with an annular groove disposed on said outer member near the open end of said open portion.

4. A self-aligning bearing according to claim 1 wherein the open portion and said intermediate member are open at both their corresponding ends and said inner member having an axial hole, said annular lip disposed on said intermediate member to register with an annular groove disposed on said outer member near one open end of said open portion, said outer member having an annular lip disposed at the other end of said open portion to define a seat for said intermediate member.

5. A method of making a self-aligning bearing comprising the steps of inserting a ball member in an intermediate member of preformed resilient, self-lubricating material, inserting said intermediate member with said inserted ball member therein into an outer member at its open portion wherein an annular lip disposed on said intermediate member registers with an annular groove disposed in said open portion, thereby to solely mechanically restrain said intermediate member in place within said open portion of said outer member and to solely mechanically restrain said ball member for rotatable movement within said intermediate member, said intermediate member, when in its assembled position, having a spherical inner surface generally conforming to the convex outer surface of said ball member and forming the sole bearing surface for the inner member.

6. A self-aligning bearing according to claim 1 wherein said self-lubricating material is a plastic.

7. A self-aligning bearing according to claim 6 wherein said plastic is Teflon.

8. A self-aligning bearing according to claim 3 wherein said open portion has a conical section disposed at its closed end which generally conforms to and provides a seating surface for said intermediate member.

9. A self-aligning bearing according to claim 8 wherein said convex outer surface of said inner member defines a solid body of revolution.

10. A self-aligning bearing according to claim 1 wherein the open portion and said intermediate member are open at both their corresponding ends and said inner member having an axial hole, two annular lips disposed on said intermediate member to register respectively with two annular grooves disposed on said outer member each near the open end of said open portion.

* * * * *